(12) United States Patent
Bae et al.

(10) Patent No.: US 11,163,197 B2
(45) Date of Patent: Nov. 2, 2021

(54) SUBSTRATE

(71) Applicant: LG Chem, Ltd., Seoul (KR)

(72) Inventors: Nam Seok Bae, Daejeon (KR); Seung Heon Lee, Daejeon (KR); Song Ho Jang, Daejeon (KR); Dong Hyun Oh, Daejeon (KR); Jin Woo Park, Daejeon (KR); Ji Young Hwang, Daejeon (KR); Jung Sun You, Daejeon (KR); Han Min Seo, Daejeon (KR); Cheol Ock Song, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/751,778

(22) Filed: Jan. 24, 2020

(65) Prior Publication Data
US 2020/0233252 A1 Jul. 23, 2020

Related U.S. Application Data

(63) Continuation of application No. PCT/KR2018/008553, filed on Jul. 27, 2018.

(30) Foreign Application Priority Data

Jul. 27, 2017 (KR) .......... 10-2017-0095466
Jul. 26, 2018 (KR) .......... 10-2018-0087287

(51) Int. Cl.
*G02F 1/1339* (2006.01)
*G02F 1/1333* (2006.01)
*G02F 1/1335* (2006.01)

(52) U.S. Cl.
CPC .... *G02F 1/13394* (2013.01); *G02F 1/133305* (2013.01); *G02F 1/133512* (2013.01); *G02F 1/13396* (2021.01)

(58) Field of Classification Search
None
See application file for complete search history.

(56) References Cited

U.S. PATENT DOCUMENTS 6,016,181 A 1/2000 Shimada
2005/0112485 A1* 5/2005 Lee ............... G02F 1/133516
430/64

(Continued)

FOREIGN PATENT DOCUMENTS

CN 201804187 U 4/2011
CN 105093709 A 11/2015
(Continued)

OTHER PUBLICATIONS

Taiwan Search Report for Application No. 107125950 dated May 4, 2020, 1 page.
(Continued)

*Primary Examiner* — Phu Vu
(74) *Attorney, Agent, or Firm* — Lerner, David, Littenberg, Krumholz & Mentlik, LLP

(57) ABSTRACT

A substrate having a spacer thereon and an optical device including the same are disclosed herein. In some embodiments, a substrate includes a base layer, a transparent column spacer formed on the base layer, and a black layer present between the transparent column spacer and the base layer. In some embodiments, an alignment film is present on the spacer.

9 Claims, 36 Drawing Sheets

(56) References Cited

U.S. PATENT DOCUMENTS

| | | | |
|---|---|---|---|
| 2005/0140858 A1* | 6/2005 | Park | G02F 1/1333 |
| | | | 349/110 |
| 2009/0122242 A1 | 5/2009 | Nakamura | |
| 2010/0053759 A1 | 3/2010 | Inoue et al. | |
| 2010/0072468 A1 | 3/2010 | Yamazaki et al. | |
| 2010/0103121 A1 | 4/2010 | Kim et al. | |
| 2011/0236604 A1 | 9/2011 | Fujiwara et al. | |
| 2014/0293182 A1 | 10/2014 | Kim et al. | |
| 2015/0198835 A1 | 7/2015 | Kwon et al. | |
| 2015/0219951 A1* | 8/2015 | Yuan | G03F 1/80 |
| | | | 349/106 |
| 2016/0282686 A1 | 9/2016 | Kubota et al. | |
| 2017/0090232 A1* | 3/2017 | Tang | G02F 1/1368 |
| 2017/0293175 A1 | 10/2017 | Lin | |
| 2018/0259808 A1* | 9/2018 | Lee | G02F 1/133514 |
| 2019/0179190 A1* | 6/2019 | Chen | G02F 1/133305 |

FOREIGN PATENT DOCUMENTS

| | | | |
|---|---|---|---|
| EP | 0022311 A1 | 1/1981 | |
| JP | 2001234267 A | 8/2001 | |
| JP | 3472422 B2 | 12/2003 | |
| JP | 2006184505 A | 7/2006 | |
| JP | 2009128799 A | 6/2009 | |
| JP | 2010079240 A | 4/2010 | |
| JP | 2011197521 A | 10/2011 | |
| KR | 20040051951 A | 6/2004 | |
| KR | 100475165 B1 | 3/2005 | |
| KR | 20050049985 A | 5/2005 | |
| KR | 100662781 B1 | 1/2007 | |
| KR | 20080010808 A | 1/2008 | |
| KR | 101022552 B1 | 3/2011 | |
| KR | 101036723 B1 | 5/2011 | |
| KR | 20150083956 A | 7/2015 | |
| KR | 101564332 B1 | 10/2015 | |
| TW | 200420964 A | 10/2004 | |
| TW | 200730889 A | 8/2007 | |
| TW | 200910001 A | 3/2009 | |
| TW | 201637165 A | 10/2016 | |
| TW | 201640202 A | 11/2016 | |
| TW | 201743423 A | 12/2017 | |
| WO | 2017057281 A1 | 4/2017 | |

OTHER PUBLICATIONS

International Search Report for Application No. PCT/KR2018/008553 dated Dec. 10, 2018, 2 pages.
Taiwan Seach Report for Application No. 107125950 dated Jul. 26, 2018, 1 page.
Extended European Search Report including the Written Opinion for Application No. EP 18838175.0 dated Apr. 24, 2020, 7 pages.

* cited by examiner

SUBSTRATE

CROSS-REFERENCE TO RELATED APPLICATION(S)

The present application is a continuation of International Application No. PCT/KR2018/008553, filed on Jul. 27, 2018, which claims priority from Korean Patent Application No. 10-2017-0095466, filed on Jul. 27, 2017, and Korean Patent Application No. 10-2018-0087287, filed on Jul. 26, 2018, the disclosures of which are incorporated by reference herein.

TECHNICAL FIELD

The present application relates to a substrate.

BACKGROUND ART

An optical device capable of adjusting light transmittance or colors or reflectance by disposing a light modulating material such as a liquid crystal compound or a mixture of a liquid crystal compound and a dye between substrates disposed opposite to each other is known. For example, Patent Document 1 discloses a so-called GH cell (guest host cell) applying a mixture of a liquid crystal host and a dichroic dye guest.

In such a device, so-called spacers are located between the substrates to maintain the spacing between the substrates.

PRIOR ART DOCUMENTS

Patent Documents

Patent Document 1: European Patent Publication No. 0022311

DISCLOSURE

Technical Problem

The present application provides a substrate.

Technical Solution

Among physical properties mentioned in this specification, when the measured temperature affects the results, the relevant physical properties are physical properties measured at room temperature, unless otherwise specified. The term room temperature is a natural temperature without being heated or cooled, which may be, for example, any temperature in a range of 10° C. to 30° C., or about 23° C. or about 25° C. or so. In addition, unless otherwise specified herein, the unit of temperature is ° C.

Among physical properties mentioned in this specification, when the measured pressure affects the results, the relevant physical properties are physical properties measured at room pressure, unless otherwise specified. The term normal pressure is a natural pressure without being pressurized or depressurized, where usually about 1 atm is referred to as the normal pressure.

Figure 1:
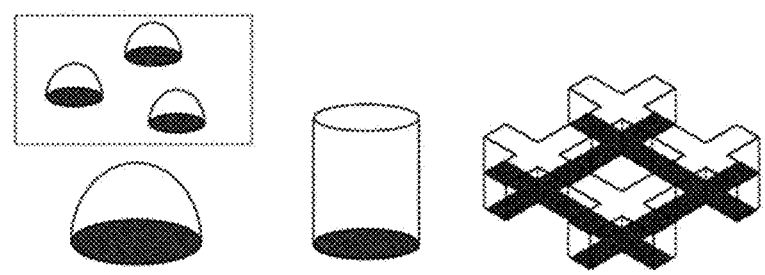
FIG. 1 is a schematic diagram depicting spacers and black layers formed on the bottom thereof in accordance with the present disclosure.

The substrate of the present application comprises a base layer and a spacer existing on the base layer, which may also comprise a black layer between the base layer and the spacer. At this time, the spacer may be formed in various shapes, and for example, FIG. 1 is a schematic diagram showing a case where a black layer is formed on the bottom of a hemispherical, cylindrical, rectangular columnar or mesh spacer.

Figure 2:
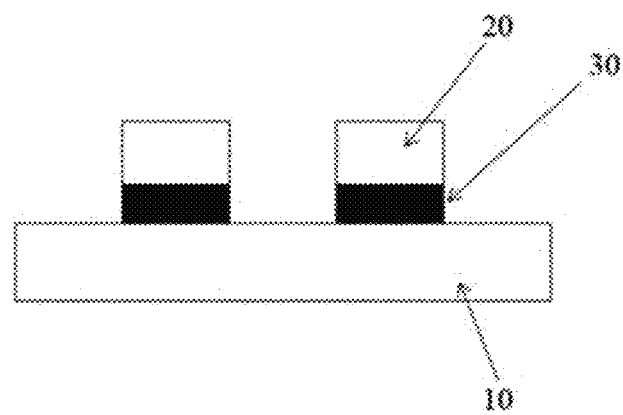
FIG. 2 is a schematic diagram depicting an exemplary substrate in accordance with the present disclosure.
Figure 3:
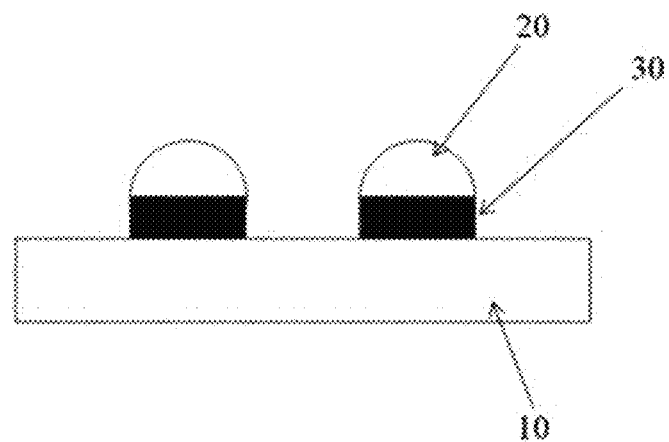
FIG. 3 is a schematic diagram depicting an exemplary substrate in accordance with the present disclosure.

FIGS. 2 and 3 are diagrams showing an exemplary substrate of the present application, which is a case where the spacer (20) is present on the base layer (10).

As the base layer, any base layer used in a substrate in a configuration of a known optical device such as an LCD (liquid crystal display) can be applied without particular limitation. For example, the base layer may be an inorganic base layer or an organic base layer. As the inorganic base layer, a glass base layer or the like can be exemplified, and as the organic base layer, various plastic films or the like can be exemplified. The plastic film can be exemplified by a TAC (triacetyl cellulose) film; a COP (cycloolefin copolymer) film such as a norbornene derivative; an acrylic film such as PMMA (poly(methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenemaphthatate) film; a PET (polyethyleneterephtalate) film; a PI (polyimide) film; a PSF (polysulfone) film or a PAR (polyarylate) film, and the like, but is not limited thereto.

In one example, the base layer may be a so-called flexible base layer. In the present application, a black layer to be described below can also be effectively formed on the flexible base layer without defects such as cracks, and durability of the black layer can be secured even when the base layer is bending according to applications or the like. The specific kind of the flexible base layer is not particularly limited, and among the above-described base layers, a plastic film or a very thin inorganic base material such as thin glass can be mainly used as the flexible base layer.

In the substrate of the present application, the thickness of the base layer is also not particularly limited, where an appropriate range may be selected depending on applications.

A spacer is present on the base layer. The spacer may be fixed to the base layer. In this case, the spacer may be fixed directly in contact with the base layer, or if there are other layers between the base layer and the spacer, it may be fixed on the relevant other layer. The kind of the other layer includes a known layer necessary for driving the optical device, and for example, an electrode layer or a black layer, and the like, which is described below, can be exemplified.

In one example of the substrate of the present application, the spacer may be a transparent column spacer, and a black layer may be formed on the bottom of the transparent column spacer.

Here, the fact that the spacer is transparent means a case where the transmittance for light having at least one of wavelength regions or the entire wavelength region in the visible light region is 50% or more, 55% or more, 60% or more, 65% or more, 70% or more, 75% or more, 80% or more, 85% or more, or 90% or more, and in this case, the upper limit of the transmittance is not particularly limited. The transparent column spacer as above can be formed according to a method for producing a general column spacer using a transparent resin. Typically, the visible light region is in a range of approximately 380 nm to 720 nm, and in one example, the transmittance can be measured at a wavelength of approximately 550 nm.

In the present application, the shape of the column spacer is not particularly limited, and for example, a cylindrical shape, a polygonal column shape such as a triangular, quadrangular, pentagonal or hexagonal column shape, a hemispherical shape, a mesh shape or other shapes can be all applied. FIG. 1 is a cross-sectional diagram to which a quadrangle columnar spacer (20) is applied, and FIG. 2 is a cross-sectional diagram to which a hemispherical spacer (20) is applied.

In the present application, a black layer is present on the bottom of the transparent column spacer, i.e., between the transparent column spacer and the base layer.

In this specification, the term top means the direction from the base layer toward the spacer formed on the base layer, and the bottom means the opposite direction of the top. Here, the black layer may also mean a layer having an optical density of about 1 to 6 or so. The black layer may also exhibit the optical density when observed in any one direction of the top and the bottom of the substrate, and in some cases, it may exhibit the optical density when observed in both of the top and bottom sides. The optical density can be obtained by measuring the transmittance (unit: %) of the black layer and then substituting it into an equation of optical density (optical density=$-\log_{10}$ (T), where T is the transmittance). In another example, the optical density may be about 1.5 or more, 2 or more, 2.5 or more, 3 or more, 3.5 or more, 4 or more or 4.5 or more or so, or may be about 5.5 or less or 5 or less or so.

In an optical device capable of adjusting light transmittance, colors and/or reflectance, the region where the spacer exists becomes an optically inactive region. Therefore, in some cases, it is necessary to black the region where the spacer exists. To this end, for example, a method of blacking the spacer itself, such as a method of manufacturing a column spacer using a black resin, may be considered, but in such a case, since the black resin itself absorbs light, so that a curing process is not easy, it is not easy to manufacture a high step spacer. However, the introduction of such a structure can form a substrate which prevents degradation of optical characteristics due to inactive regions upon driving an optical device, while being formed in high steps.

For example, the spacer may have a height in a range of 1 μm to 50 μm. In another example, the height may be 3 μm or more, 5 μm or more, 7 μm or more, 9 μm or more, 11 μm or more, 13 μm or more, 15 μm or more, 17 μm or more, 19 μm or more, 21 μm or more, 23 μm or more, 25 μm or more, or 27 μm or more, and may also be 48 μm or less, 46 μm or less, 44 μm or less, 42 μm or less, 40 μm or less, 38 μm or less, 36 μm or less, 34 μm or less, 32 μm or less, 30 μm or less, 28 μm or less, or 26 μm or less.

The black layer may be formed using various materials capable of realizing black. For example, the black layer may be a metal layer, a metal oxide layer, a metal nitride layer or a metal oxynitride layer, or may be a layer containing a pigment or a dye.

The specific material of the black layer is not particularly limited, and for example, a metal such as gold (Au), lead (Pb), niobium (Nb), palladium (Pd), platinum (Pt), silver (Ag), vanadium (V), tin (Sn), aluminum (Al), copper (Cu), nickel (Ni), vanadium (V), tungsten (W), tantalum (Ta), molybdenum (Mo), titanium (Ti), iron (Fe), chromium (Cr) or cobalt (Co), an alloy metal containing two or more of the metals, an oxide, a nitride or an oxynitride of the metal, and the like can be used, and various pigments or dyes capable of realizing black can also be used.

Figure 4:
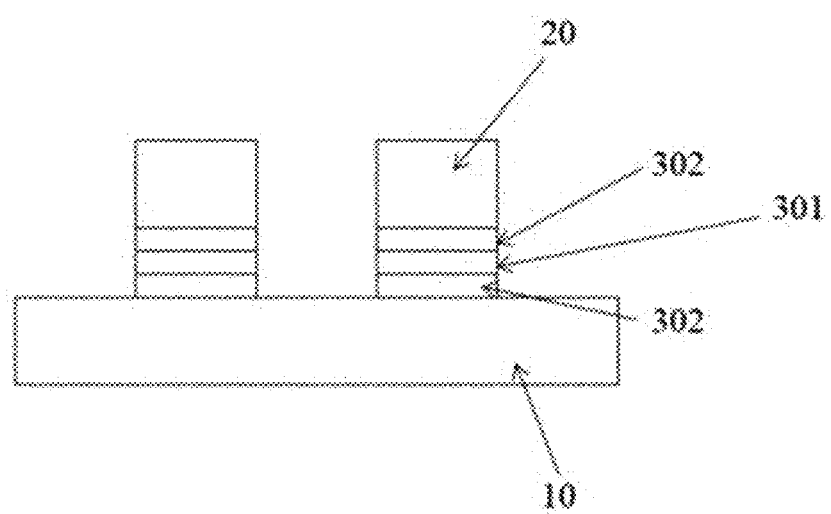
FIG. 4 is a schematic diagram depicting an exemplary substrate in accordance with the present disclosure.
Figure 5:
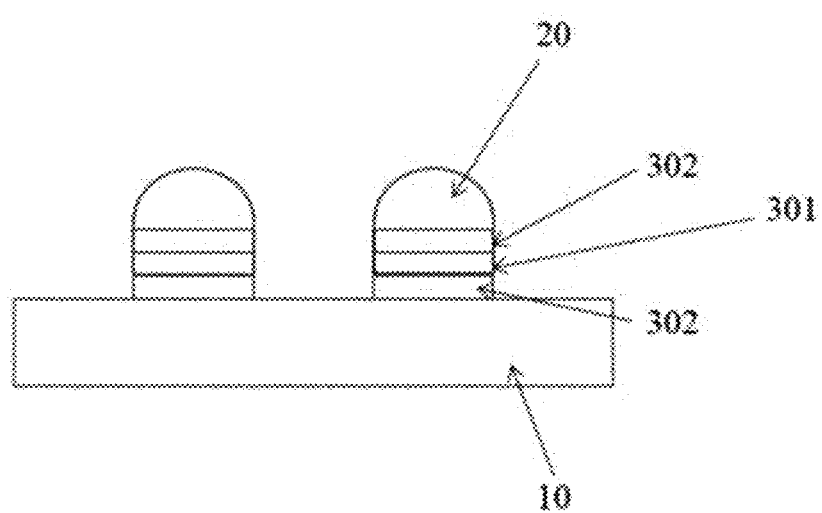
FIG. 5 is a schematic diagram depicting an exemplary substrate in accordance with the present disclosure.

Depending on the purpose, the black layer may have a single-layer structure or a multilayer structure. In one example, the black layer may have a multilayer structure in order to achieve the desired darkening while ensuring process efficiency. For example, the black layer may have a multilayer structure of a two-layer structure comprising a first layer which is a metal layer and a second layer which is a metal oxide layer, a metal nitride layer or a metal oxynitride layer, or a three-layer structure in which the second layer is formed on both sides of the first layer. In one example, the second layer may be a metal oxynitride layer. FIGS. 4 and 5 are examples of a substrate on which a black layer having a three-layer structure, wherein the first layer (301) and the second layer (302) are formed thereon as above, is formed. In such a multilayer structure, the inherent refractive indexes, transmission characteristics and/or reflection characteristics of the first layer and the second layer may be correlated with each other to attain an appropriate darkening, and particularly, in the case of the above-mentioned multilayer structure of three layers or more, the appropriate darkening may be achieved on both sides of the black layer. The specific kind of the metal, the metal oxide, the metal nitride and/or the metal oxynitride used in the first layer and the second layer is not particularly limited, and for example, a suitable kind among the above-mentioned materials can be selected. In one example, the second layer may have an oxide, nitride or oxynitride containing the same metal as applied in the first layer.

The spacer and the black layer as above may be overlapped with each other when viewed from the top or bottom.

The black layer may have an area equal to or smaller than that of the bottom of the spacer. That is, for example, the black layer may exist only substantially within the area where the spacer is present. For example, the ratio (T/B) of the area (B) of the black layer and the area (T) of the bottom of the spacer may be in a range of 0.5 to 1.5. In another example, the ratio (T/B) may be about 0.55 or more, about 0.6 or more, about 0.65 or more, about 0.7 or more, about 0.75 or more, about 0.8 or more, about 0.85 or more, about 0.9 or more, or about 0.95 or more. Also, in another example, the ratio (T/B) may be about 1.45 or less, about 1.4 or less, about 1.35 or less, about 1.3 or less, about 1.25 or less, about 1.2 or less, about 1.15 or less, about 1.1 or less, or about 1.05 or less. In this arrangement, it is possible to suitably prevent light leakage or the like from being caused upon driving the optical device, while ensuring adequate adhesion of the spacer to the substrate.

Such a black layer may have an appropriate thickness in consideration of the desired step and darkening, and the like. For example, the thickness of the black layer may be in a range of 30 nm to 5000 nm. The thickness of each layer in the case where the black layer is formed in a multilayer structure can also be selected in consideration of the desired step and/or darkening, and the like. For example, in the above-mentioned multilayer structure, each of the first layer and the second layer may have a thickness in a range of 30 nm to 200 nm.

In one example, the black layer may be formed based on a material having a physical ductility value of 0.6 or more. In this specification, the term physical ductility value is a value known in the industry per material, which is a value obtained through the following equations A and B based on the Poisson ratio (v) of the material. The physical ductility value has a value in a range of 0 to 1, which means that as the value is closer to 1, the material has more ductile characteristics.

$$\kappa = \frac{1-2v}{1+v} \quad \text{[Equation A]}$$

In Equation A, v is the Poisson's ratio of the material.

$$D=3x^2-2x^3 \quad \text{[Equation B]}$$

In Equation B, D is the physical ductility value, x is the value obtained by Equation $x=(1-\kappa)^2$, and $\kappa$ is the value obtained in Equation A.

The black layer may comprise a material having the physical ductility value of 0.55 or more, where the material may be, for example, a metal. By applying such a material, it is possible to solve a problem that cracks occur in a process of forming a black layer or in the case where the substrate is bent depending on applications, and the like, or other defects occur. In another example, the physical ductility value may also be about 1 or less, about 0.95 or less, about 0.9 or less, about 0.85 or less, about 0.8 or less, about 0.75 or less, about 0.7 or less, or about 0.65 or less or so, and may also be about 0.6 or more. Such a material can be exemplified by, for example, gold (Au, physical ductility: about 0.93), lead (Pb, physical ductility: about 0.93), niobium (Nb, physical ductility: about 0.82), palladium (Pd, physical ductility: about 0.80), platinum (Pt, physical ductility: about 0.76), silver (Ag, physical ductility: about 0.73), vanadium (V, physical ductility: about 0.73), tin (Sn, physical ductility: about 0.69), aluminum (Al, physical ductility: about 0.65) or copper (Cu, physical ductility: about 0.62), and the like, but is not limited thereto.

The contents related to the black layer already described herein can be equally applied using a material having the physical ductility value of 0.6 or more.

For example, the metal layer, the metal oxide layer, the metal nitride layer, and/or the metal oxynitride layer can be formed using a metal having the physical ductility value of 0.6 or more, and the contents of whether a single layer or multilayers, thickness, other forms, and the like can also be applied equally.

The shape of the spacer formed together with the black layer is not particularly limited, as described above.

The spacer includes a curved portion. In one example, the spacer may be a hemispherical spacer where the curved portion is a hemispherical portion that is formed at least at the top end of the spacer. By applying the spacer having such a curved portion, even when orientation treatment such as rubbing orientation or photo-orientation is performed after an alignment film is formed on the base layer on which the spacer is formed, the uniform orientation treatment can be performed even in the region where the spacer exists without influence of the step by the spacer.

In the present application, the term curved portion may mean a part of the spacer including a curved shape in which the trajectory of the cross section has a predetermined curvature. In addition, the trajectory of the cross section of the curved portion may include a curved part where the center of curvature is present inside the cross-sectional trajectory.

In one example, the curved portion may have a maximum curvature of the cross-sectional trajectory of 2,000 mm$^{-1}$ or less. As is known, the curvature is a numerical value representing a degree of curvature of a line, which is defined as an inverse number of a radius of curvature which is a radius of a contact circle at a predetermined point of the relevant curve. In the case of a straight line, the curvature is 0, and the larger the curvature, the more curved the curve exists.

By controlling the degree of bending of the curved portion so that the maximum curvature of the cross-sectional trajectory of the curved portion is 2,000 $mm^{-1}$ or less, the uniform orientation treatment can be performed even when the orientation treatment of the alignment film is performed at the top of the curved portion. Here, the cross section for confirming the cross-sectional trajectory of the curved portion may be any normal plane for the base layer. In addition, the maximum curvature may mean the largest curvature among the curvatures for all the contact circles that can be obtained on the cross-sectional trajectory of the curved portion. In other words, the cross-sectional trajectory of the curved portion may not include the bent portion such an extent that the curvature exceeds 2,000 $mm^{-1}$.

In another example, the maximum curvature may be 1,800 $mm^{-1}$ or less, 1,600 $mm^{-1}$ or less, 1,400 $mm^{-1}$ or less, 1,200 $mm^{-1}$ or less, 1,000 $mm^{-1}$ or less, 900 $mm^{-1}$ or less, 950 $mm^{-1}$ or less, 800 $mm^{-1}$ or less, 750 $mm^{-1}$ or less, 700 $mm^{-1}$ or less, 650 $mm^{-1}$ or less, 600 $mm^{-1}$ or less, 550 $mm^{-1}$ or less, 500 $mm^{-1}$ or less, 450 $mm^{-1}$ or less, 400 $mm^{-1}$ or less, 350 $mm^{-1}$ or less, 300 $mm^{-1}$ or less, 250 $mm^{-1}$ or less, 200 $mm^{-1}$ or less, or 150 $mm^{-1}$ or less or so. In another example, the maximum curvature may be 5 $mm^{-1}$ or more, 10 $mm^{-1}$ or more, 15 $mm^{-1}$ or more, 20 $mm^{-1}$ or more, 25 $mm^{-1}$ or more, 30 $mm^{-1}$ or more, 40 $mm^{-1}$ or more, 45 $mm^{-1}$ or more, or 50 $mm^{-1}$ or more.

The cross-sectional trajectory of the curved portion may or may not include a portion having curvature of 0, that is, a linear portion.

Figure 8:
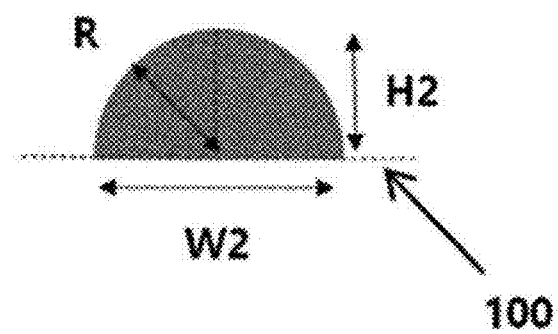
FIG. 8 is a schematic diagram of a spacer in accordance with the present disclosure.
Figure 9:
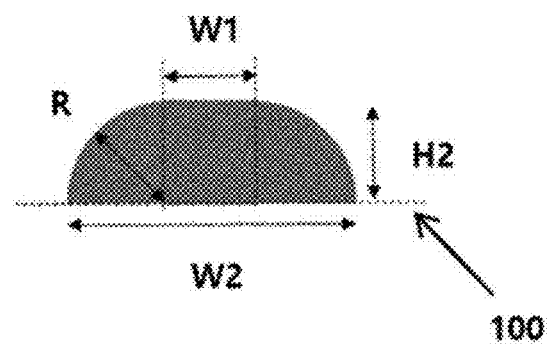
FIG. 9 is a schematic diagram of a spacer in accordance with the present disclosure.

For example, FIG. 8 is an example of a cross-sectional trajectory of a curved portion (e.g., a hemispherical portion) that does not include a portion having curvature of 0, and FIG. 9 is an example of a cross-sectional trajectory of a curved portion including a portion having curvature of 0.

The spacer may comprise the curved portion as above at least at the top end of the spacer. The spacer may be formed in various shapes as long as it comprises the curved portion. For example, the spacer may be a shape in which the curved portion is directly formed on the surface of the base layer (100), as shown in FIG. 8 or 9, or may be a columnar spacer including the curved portion at the top end, as shown in FIG. 10 or 11.

Figure 10:
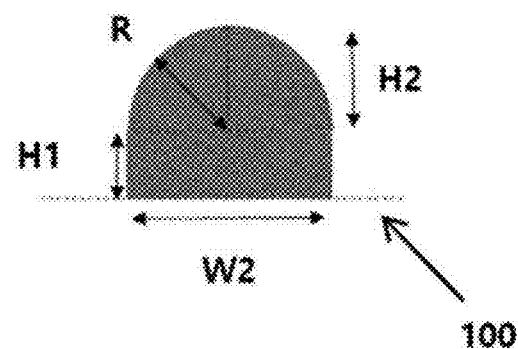
FIG. 10 is a schematic diagram of a spacer in accordance with the present disclosure.
Figure 11:
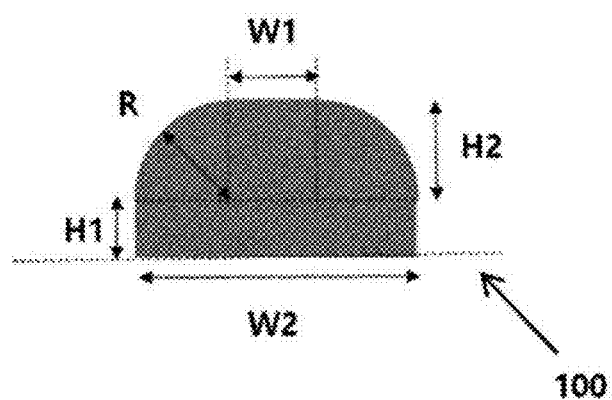
FIG. 11 is a schematic diagram of a spacer in accordance with the present disclosure.

In the curved portion of the spacer, the cross-sectional trajectory may not include a portion having curvature of 0, as shown in FIG. 8 or 10, or the cross-sectional trajectory may also include a portion (a flat surface at the top end) having curvature of 0, as shown in FIG. 9 or 11. Hereinafter, for convenience, the curved portion of the same shape as that of a hemisphere in FIG. 8 or 10 may be referred to as a hemispherical portion, and the curved portion having a shape in which a flat surface is formed on the top end of the spacer in FIG. 9 or 11 may be referred to as a curved portion including a flat portion.

In FIGS. 8 to 11, H2 is the height of the curved portion, R is the radius of curvature of the curved portion, W1 is the length (width) of the flat surface of the flat portion, W2 is the width of the spacer, H1 is the value obtained by subtracting the height (H2) of the curved portion from the total height of the spacer.

The curved portion may be a complete hemispherical shape or may be one having an approximately hemispherical shape. The complete hemispherical shape may be a hemispherical shape satisfying Relational Expression 1 to be described below, and the approximate hemispherical shape may be a hemispherical shape satisfying any one of Relational Expressions 2 to 4 below.

The curved portion may have a shape in which the cross-sectional shape satisfies any one of Relational Expressions 1 to 4 below.

$a=b=R$ [Relational Expression 1]

$a \neq b=R$ or $b \neq a=R$ [Relational Expression 2]

$a=b<R$ [Relational Expression 3]

$a \neq b<R$ [Relational Expression 4]

In Relational Expressions 1 to 4, a is the horizontal length of the curved portion section measured at the center of the virtual contact circle of the curved portion section, b is the vertical length of the curved portion section measured at the center of the virtual contact circle of the curved portion section, and R is the curvature radius of the virtual contact circle of the curved portion section.

The curvature radius in Relational Expressions 1 to 4 corresponds to the length indicated by R in FIGS. 8 to 11.

In Relational Expressions 1 to 4, the virtual contact circle may mean a contact circle having the largest curvature radius among a plurality of virtual contact circles in contact with the curved line forming the curved portion.

If the curved portion is the complete hemispherical portion as shown in FIGS. 8 and 10, the cross section of the curved portion as a whole is a curved line, and thus a contact circle having the largest curvature radius among a plurality of virtual contact circles in contact with any point of the relevant curved line may be a contact circle as referred to in Relational Expressions 1 to 4. In addition, if the curved portion includes a flat portion as shown in FIGS. 9 and 11, a contact circle having the largest curvature radius among a plurality of virtual contact circles in contact with any point of both side curved lines excluding the flat line on the top in the curved portion section becomes a virtual contact circle as referred to in Relational Expressions 1 to 4.

In Relational Expressions 1 to 4, the horizontal length is a length measured in a direction horizontal to the base layer surface (Reference Numeral 100 in FIGS. 8 to 11) at the center point of the virtual contact circle, and the vertical length is a length measured in a direction vertical to the base layer surface (Reference Numeral 100 in FIGS. 8 to 11).

In Relational Expressions 1 to 4, a is the length from the center of the virtual contact circle of the curved portion section to the point where the curved portion is terminated as measured while proceeding in the horizontal direction. This horizontal length may have two lengths of a length from the center of the virtual contact circle as measured while proceeding in the rightward direction and a length measured while proceeding in the leftward direction, where a applied in Relational Expressions 1 to 4 means a short length of the two lengths. In the case of the hemispherical portion having a shape of FIGS. 8 and 10, the horizontal length (a) is a value corresponding to ½ of the width (W2) of the spacer. Also, in the case of FIGS. 9 and 11, the value (2a+W1) obtained by adding the length (width) (W1) of the flat portion to twice the horizontal length (a) may correspond to the width (W2) of the spacer.

In Relational Expressions 1 to 4, b is the length from the center of the virtual contact circle of the curved portion section to the point where the curved portion first meets while proceeding in the vertical direction. Usually, this vertical length (b) may be approximately the same as the height of the curved portion, for example, the length indicated by Symbol H2 in FIGS. 8 to 11.

Figure 12:
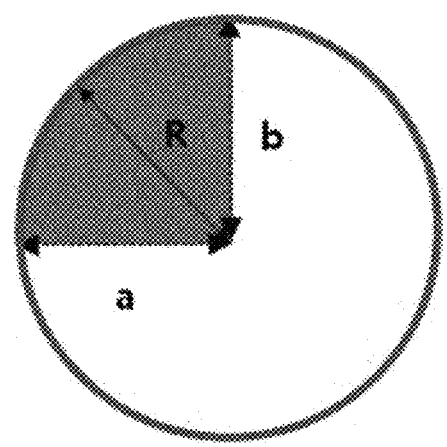
FIG. 12 is a diagram for explaining exemplary forms of spacers in accordance with the present disclosure.
Figure 13:
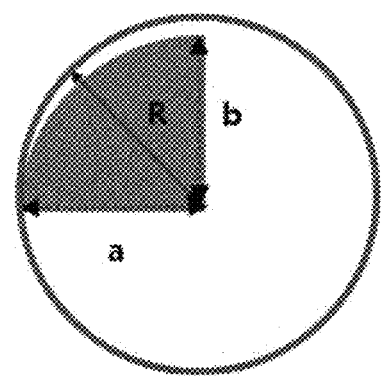
FIG. 13 is a diagram for explaining exemplary forms of spacers in accordance with the present disclosure.
Figure 14:
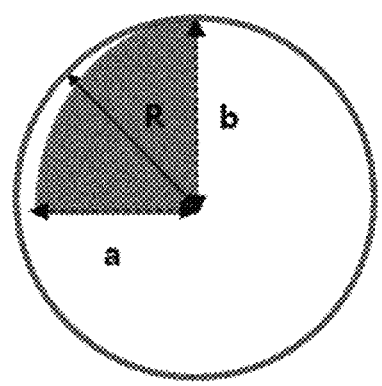
FIG. 14 is a diagram for explaining exemplary forms of spacers in accordance with the present disclosure.
Figure 15:
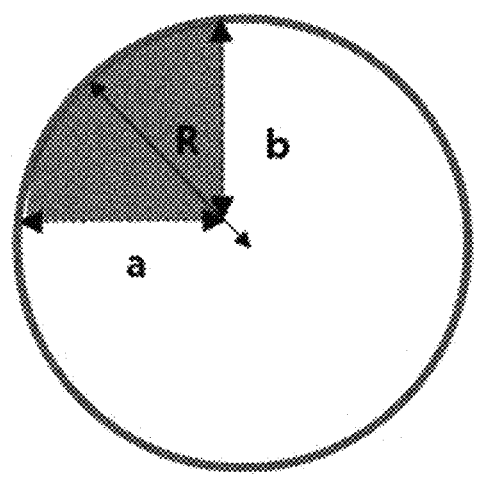
FIG. 15 is a diagram for explaining exemplary forms of spacers in accordance with the present disclosure.
Figure 16:
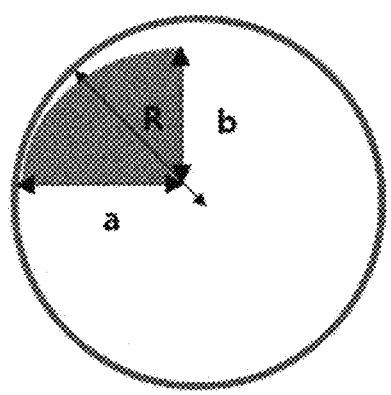
FIG. 16 is a diagram for explaining exemplary forms of spacers in accordance with the present disclosure.
Figure 17:
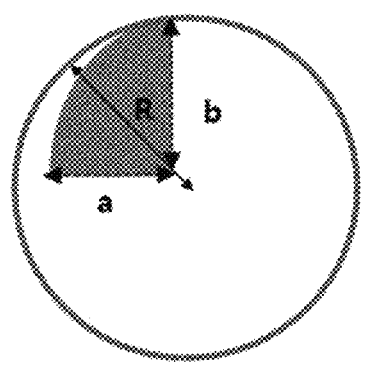
FIG. 17 is a diagram for explaining exemplary forms of spacers in accordance with the present disclosure.

FIG. 12 is a cross-sectional curve shape of the curved portion satisfying Relational Expression 1 above, which shows a case where the curved line of the curved portion has a complete circle curve, that is, a curve coinciding with the virtual contact circle.

Also, FIGS. 13 to 17 show approximate curve shapes of the curved portion satisfying any one of Relational Expressions 2 to 4.

A tapered portion, in which the cross-sectional trajectory is a curved shape that the curvature center is formed outside the cross section, may be formed at the bottom end of the spacer, for example, the bottom contacting the base layer side. With this form, an excellent effect according to the specific shape of the spacer of the present application, for example, achievement of the uniform orientation treatment or the like can be further improved.

The dimension of the spacer having the same shape as above is not particularly limited, which can be appropriately selected in consideration of, for example, a cell gap of the desired optical device or an aperture ratio, and the like.

For example, the height of the curved portion (H2 in FIGS. 8 to 11) may be in a range of 1 µm to 20 µm. In another example, the height may be 2 µm or more, 3 µm or more, 4 µm or more, 5 µm or more, 6 µm or more, 7 µm or more, 8 µm or more, 9 µm or more, 10 µm or more, or 11 µm or more. In another example, the height may also be 19 µm or less, 18 µm or less, 17 µm or less, 16 µm or less, 15 µm or less, 14 µm or less, 13 µm or less, 12 µm or less, or 11 µm or less.

In addition, the width of the curved portion (W2 in FIGS. 8 to 11) may be in a range of 2 µm to 40 µm. In another example, the width may be 4 µm or more, 6 µm or more, 8 µm or more, 10 µm or more, 12 µm or more, 14 µm or more, 16 µm or more, 18 µm or more, 20 µm or more, or 22 µm or more. In another example, the width may be 38 µm or less, 36 µm or less, 34 µm or less, 32 µm or less, 30 µm or less, 28 µm or less, 26 µm or less, 24 µm or less, or 22 µm or less.

When the spacer has the shape as shown in FIG. 8 or 9, the height of the spacer may be the same as the height of the curved portion, and when the spacer has the shape as shown in FIGS. 10 and 11, it may be a value obtained by adding the height (H1) of a columnar portion to the height of the curved portion. In one example, the height may be in a range of 1 µm to 50 µm.

In another example, the height may be 3 µm or more, 5 µm or more, 7 µm or more, 9 µm or more, 11 µm or more, 13 µm or more, 15 µm or more, 17 µm or more, 19 µm or more, 21 µm or more, 23 µm or more, 25 µm or more, or 27 µm or more. In another example, the height may be 48 µm or less, 46 µm or less, 44 µm or less, 42 µm or less, 40 µm or less, 38 µm or less, 36 µm or less, 34 µm or less, 32 µm or less, 30 µm or less, 28 µm or less, or 26 µm or less.

By controlling the dimension of the spacer including or not including a column portion as above, the uniform orientation treatment can be performed even with respect to the alignment film formed on the top of the spacer and the uniform cell gap can be maintained, and thus when the substrate has been applied to production of an optical device, the performance of the relevant device can be excellently maintained.

The spacer can be formed using, for example, a transparent resin, as described above. In one example, the spacer may be formed by comprising a transparent ultraviolet curable resin. For example, it may be formed by curing the ultraviolet curable compound in a state where the shape of the ultraviolet curable compound is maintained in a state capable of forming a desired shape by an imprinting method to be described below, where the ultraviolet curable resin, which is a cured product of the ultraviolet curable compound, can form the spacer. The specific kind of ultraviolet curable compound that can be used for forming the spacer is not particularly limited, and for example, an acrylate-based polymer material or an epoxy-based polymer, and the like may be used, without being limited thereto.

In the present application, the manner of producing the spacer of the above-described type by applying such a material is not particularly limited. For example, the spacer may be manufactured by applying an imprinting method.

However, in the case of spacers among various forms of the above-described spacers, it is difficult or impossible to manufacture them in a general manner, and they must be manufactured in the following manner, which is described with reference to a hemispherical shape.

Figure 18:
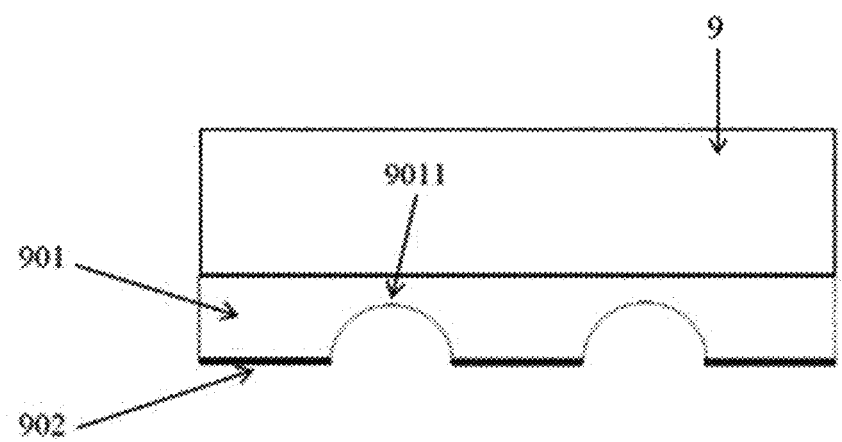
FIG. 18 is a diagram showing a shape of a mask that can be used for manufacturing a spacer of the present application, according to one example.

That is, the spacer can be manufactured by applying an imprinting mask on which a light-shielding film as schematically shown in FIG. 18 is formed. The imprinting mask, on which the light-shielding film of FIG. 18 is formed, has a form that a concave hemispherical shape (9011) is formed on one surface of a light-transmissive, for example, ultraviolet-transmissive, main body, and the light-shielding film (902) is formed on a portion where the hemispherical shape is not formed on the surface on which the hemispherical shape (9011) is formed. As shown in the drawing, the hemispherical shape (9011) may be produced by forming an imprinting mold (901) on one side of the main body (9) of the imprinting mask and forming the hemispherical shape (9011) and the light-shielding film (902) on the mold (901). If necessary, the surface of the mold (901) on which the light-shielding film (902) is formed may be subjected to appropriate mold releasing treatment.

Figure 19:
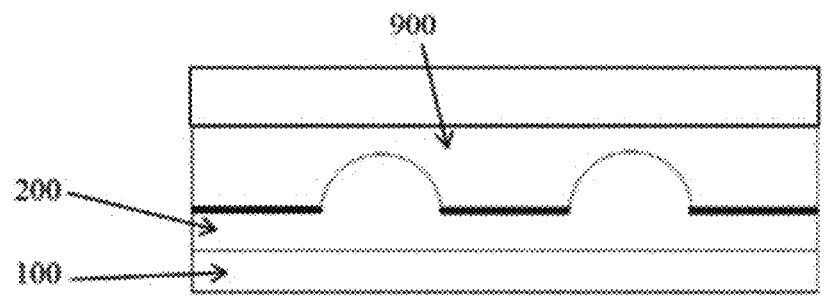
FIG. 19 is a schematic diagram of a process of manufacturing a spacer using the mask of FIG. 18.

An exemplary process for producing the spacer using the mask having the same shape as above is shown in FIG. 19. As in FIG. 19, a layer (200) of an ultraviolet curable compound is first formed on a surface of the base layer (100) and the concave portion of the mask (900) is pressed on the layer (200). Then, if the layer (200) of the compound is cured by irradiating the top of the mask, on which the light-shielding film is formed, with ultraviolet light or the like, the compound is cured according to the hemispherical shape formed on the mask (900) to form a spacer. Then, the spacer can be formed in the form fixed on the base layer (100) by removing the mask and removing the uncured compound.

The desired hemispherical or hemispherical columnar spacer can be manufactured by adjusting the quantity of ultraviolet light to be irradiated, the degree of pressing of the mask and/or the hemispherical shape of the mask (900) and the like in the above process.

For formation of the above-described black layer, the black layer may be previously formed between the layer (200) of the ultraviolet curable compound and the base layer (100) in the method of FIG. 19. That is, after the black layer is formed on the base layer (100) in advance and the curing process is performed, the substrate on which the black layer is present between the spacer and the base layer may be manufactured by removing the uncured resin layer (200) and applying the remaining cured resin layer again as a mask to remove the black layer on the base layer (100). In addition, although FIG. 19 shows a method of using a mask for manufacturing hemispherical spacers, the shape of the spacer is not limited, as described above, and thus the shape of the mask can be changed according to the shape of the desired spacer. Furthermore, as the method of forming the black layer on the top of the spacer, a reverse offset method such as a method of selectively coating a resist ink on an embossed part (the top of the spacer) can be used.

Figure 6:
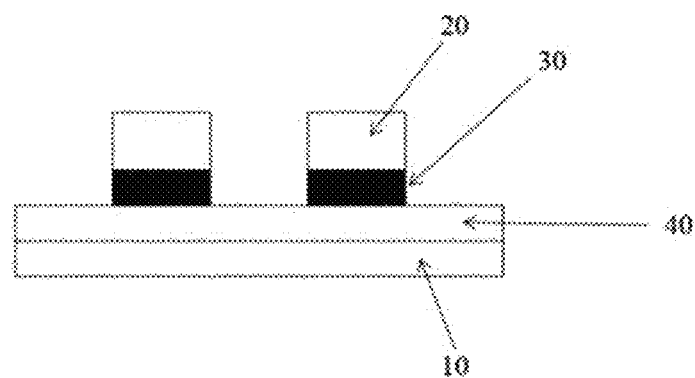
FIG. 6 is a schematic diagram depicting an exemplary substrate in accordance with the present disclosure.
Figure 7:
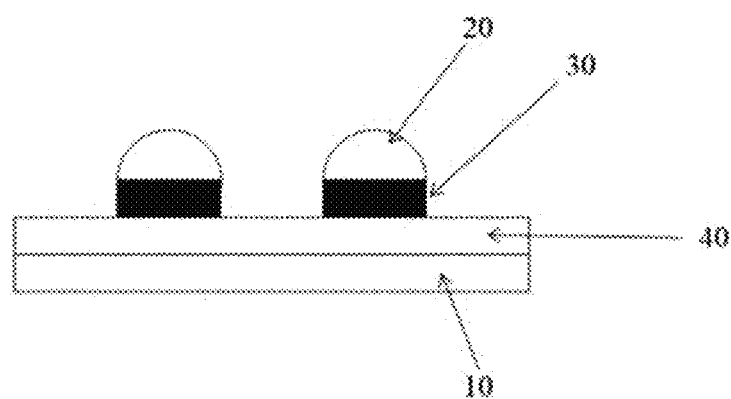
FIG. 7 is a schematic diagram depicting an exemplary substrate in accordance with the present disclosure.

The substrate of the present application may comprise, in addition to the base layer and the spacers, other elements required for driving the optical device. These elements are variously known, and typically, there is an electrode layer or the like. FIG. 6 is an example of a structure in which an electrode layer (40) is formed between the black layer (30) and the base layer (10) in the substrate of the structure of FIG. 1, and FIG. 7 is an example of a structure in which an electrode layer (40) is formed between the black layer (30) and the base layer (10) in the substrate of the structure of FIG. 2.

As in the drawing, the substrate may further comprise an electrode layer between the base layer and the spacers. As the electrode layer, a known material can be applied. For example, the electrode layer may comprise a metal alloy, an electrically conductive compound or a mixture of two or more thereof. Such a material can be exemplified by a metal such as gold, CuI, an oxide material such as ITO (indium tin oxide), IZO (indium zinc oxide), ZTO (zinc tin oxide), zinc oxide doped with aluminum or indium, magnesium indium oxide, nickel tungsten oxide, ZnO, $SnO_2$ or $In_2O_3$, a metal nitride such as gallium nitride, a metal selenide such as zinc selenide, a metal sulfide such as zinc sulfide, or the like. A transparent positive hole injecting electrode layer can also be formed by using a laminate of a metal thin film of Au, Ag or Cu, and the like, and a transparent material having high refractive index such as ZnS, $TiO_2$ or ITO.

The electrode layer may be formed by any means such as vapor deposition, sputtering, chemical vapor deposition or electrochemical means. Patterning of the electrode layer is also possible in a known manner without any particular limitation, and the electrode layer may be patterned, for example, through known photolithography or a process using a shadow mask or the like.

The substrate of the present application may further comprise an alignment film present on the base layer and the spacer.

Thus, another exemplary substrate of the present application may comprise a base layer; a spacer present on the base layer; and an alignment film formed on the base layer and the spacer.

Here, the details of the base layer and the spacer are as described above.

In addition, the kind of the alignment film formed on the base layer and the spacers is not particularly limited, where a known alignment film, for example, a known rubbing alignment film or a photo-alignment film can be applied.

A method of forming the alignment film on the base layer and the spacers and performing orientation treatment thereon is also in accordance with a known method.

Figure 20:
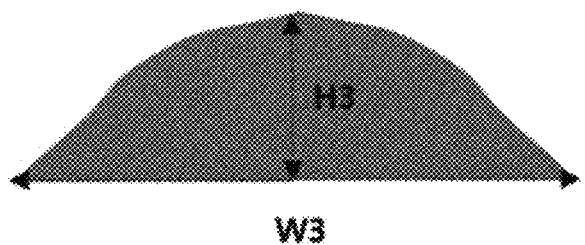
FIG. 20 is a schematic diagram of an exemplary cross section of an alignment film formed on a spacer.

However, if the alignment film is formed on the above-described spacer in one example, the alignment film may also have a unique shape depending on the shape of the spacer. FIG. 20 is a diagram schematically showing the cross-sectional trajectory of such an alignment film. FIG. 20 is an example of a cross-sectional shape of an alignment film formed on the spacer, where the top shows a hemispherical shape in which the curvature center is formed on the inner side of the cross section while having predetermined width (W3) and height (H3).

For example, the alignment film may also comprise the above-described curved portion on the top end thereof. In this case, the curved portion may have a maximum curvature of the cross-sectional trajectory of 2,000 $mm^{-1}$ or less. In another example, the maximum curvature may be 1,800 $mm^{-1}$ or less, 1,600 $mm^{-1}$ or less, 1,400 $mm^{-1}$ or less, 1,200 $mm^{-1}$ or less, 1,000 $mm^{-1}$ or less, 900 $mm^{-1}$ or less, 950 $mm^{-1}$ or less, 800 $mm^{-1}$ or less, 750 $mm^{-1}$ or less, 700 $mm^{-1}$ or less, 650 $mm^{-1}$ or less, 600 $mm^{-1}$ or less, 550 $mm^{-1}$ or less, 500 $mm^{-1}$ or less, 450 $mm^{-1}$ or less, 400 $mm^{-1}$ or less, 350 $mm^{-1}$ or less, 300 $mm^{-1}$ or less, 250 $mm^{-1}$ or less, 200 $mm^{-1}$ or less, or 150 $mm^{-1}$ or less or so. In another example, the maximum curvature may be 5 $mm^{-1}$ or more, 10 $mm^{-1}$ or more, 15 $mm^{-1}$ or more, 20 $mm^{-1}$ or more, 25 $mm^{-1}$ or more, 30 $mm^{-1}$ or more, 40 $mm^{-1}$ or more, 45 $mm^{-1}$ or more, or 50 $mm^{-1}$ or more.

The cross-sectional trajectory of the curved portion of the alignment film may or may not include a portion having curvature of 0, that is, a linear portion.

The height and width of the alignment film formed on the spacer as above are also determined according to the height and width of the spacer existing on the bottom and the thickness of the formed alignment film, and the like, which are not particularly limited.

For example, the height of the curved portion (H3 in FIG. 20) may be in a range of 1 μm to 50 μm. In another example, the height may be 2 μm or more, 3 μm or more, 4 μm or more, 5 μm or more, 6 μm or more, 7 μm or more, 8 μm or more, 9 μm or more, 10 μm or more, or 11 μm or more. In another example, the height may also be 48 μm or less, 46 μm or less, 44 μm or less, 42 μm or less, 40 μm or less, 38 μm or less, 36 μm or less, 34 μm or less, 32 μm or less, 30 μm or less, 28 μm or less, 26 μm or less, 24 μm or less, 22 μm or less, 19 μm or less, 18 μm or less, 17 μm or less, 16 μm or less, 15 μm or less, 14 μm or less, 13 μm or less, 12 μm or less, or 11 μm or less.

The width of the curved portion (W3 in FIG. 20) may be in a range of 1 μm to 80 μm. In another example, the width may be 2 μm or more, 3 μm or more, 4 μm or more, 6 μm or more, 8 μm or more, 10 μm or more, 12 μm or more, 14 μm or more, 16 μm or more, 18 μm or more, 20 μm or more, or 22 μm or more. In another example, the width may be 78 μm or less, 76 μm or less, 74 μm or less, 72 μm or less, 70 μm or less, 68 μm or less, 66 μm or less, 64 μm or less, 60 μm or less, 58 μm or less, 56 μm or less, 54 μm or less, 52 μm or less, 50 μm or less, 48 μm or less, 46 μm or less, 44 μm or less, 42 μm or less, 40 μm or less, 38 μm or less, 36 μm or less, 34 μm or less, 32 μm or less, 30 μm or less, 28 μm or less, 26 μm or less, 24 μm or less, or 22 μm or less.

As described above, in the case of the substrate of the present application, the orientation treatment of the alignment film formed on the spacer can be performed uniformly without being affected by the step of the spacer, by adjusting the shape of the spacer to a unique shape.

In order to maximize this effect, the shape of the alignment film can be further controlled.

Figure 21:
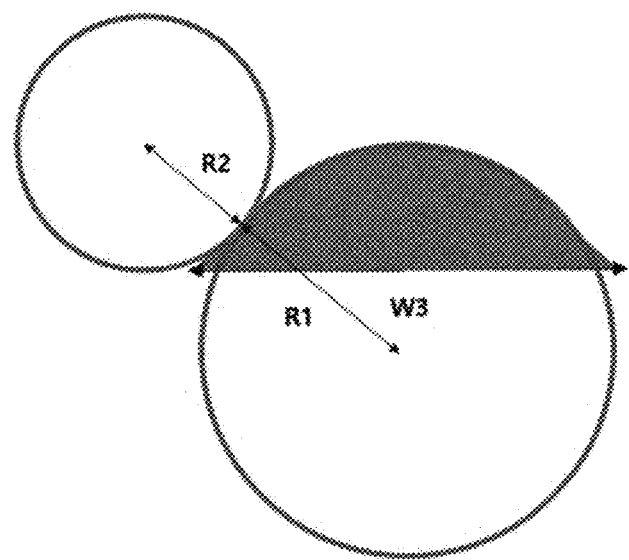
FIG. 21 is a schematic diagram of an exemplary cross section of an alignment film formed on a spacer.

For example, as the cross section of the alignment film is shown in FIGS. 20 and 21, a region facing upward from a point in contact with the substrate layer in the cross section of the alignment film may be a curved line shape in which the curvature center is formed outside the cross section. This shape can be formed, for example, in accordance with the shape of the spacer and the formation conditions of the alignment film. Accordingly, even when the orientation treatment such as rubbing treatment is performed on the alignment film, the uniform orientation treatment which is not affected by the step of the spacer can be performed.

The base layer may comprise a plurality of spacers by comprising, including the spacer as mentioned above, the same or different spacers. Such a plurality of spacers may be disposed on the base layer while having predetermined regularity and irregularity simultaneously. Specifically, at least a part of the plurality of spacers on the base layer may be in an irregular arrangement in terms of being arranged so as to have pitches different from each other, but may be regular in terms of being arranged with substantially the same density between regions determined according to a predetermined rule.

That is, in one example, at least a part of the spacers disposed on the base layer may be disposed so as to have pitches different from each other.

Here, when a part of the plurality of spacers have been selected so as to form a closed figure in a state where other spacers are not present therein, the term pitch can be defined as a length of a side of the closed figure. In addition, unless otherwise specified, the unit of the pitch is µm.

The closed figure thus formed may be a triangle, a quadrangle or a hexagon. That is, when three spacers among the plurality of spacers have been optionally selected and connected to each other, the triangle is formed; when four spacers have been selected and connected to each other, the quadrangle is formed; and when six spacers have been selected and connected, the hexagon is formed. However, upon determining the pitch, the closed figure thus formed is formed such that no spacer is present therein, and thus, for example, in the case where spacers are selected such that another spacer is present therein, they are excluded when determining the pitch.

In one example, the ratio (%) of the number of sides having the same length among sides of a triangle, a quadrangle or a hexagon, which is the closed figure thus formed (100×(number of sides of the same length)/3 in the case of a triangle, 100×(number of sides of the same length)/4 in the case of a hexagon, and 100×(number of sides of the same length)/6 in the case of a hexagon) can be 85% or less. In another example, the ratio may be 84% or less, 80% or less, 76% or less, 67% or less, 55% or less, or 40% or less. The lower limit of the ratio is not particularly limited. That is, in some cases, since the lengths of all sides of the closed figure may not be the same, the lower limit of the ratio may be 0%.

As described above, the arrangement of the spacers of the present application is irregular in that at least a part thereof has different pitches, but such irregularity is controlled under certain regularity. Here, the regularity may mean that the arrangement density of spacers is substantially close to each other between certain regions.

For example, if the normal pitch of the plurality of irregularly arranged spacers is P, when two or more square regions with 10P as a length of one side have been optionally selected on the surface of the base layer, the standard deviation of the number of spacers present in each square region is 2 or less.

The term normal pitch means a distance between the centers of adjacent spacers in a state where the plurality of spacers, in actuality, irregularly disposed on the base layer are placed so that all of the spacers are virtually disposed at the same pitch in consideration of the number of the spacers and the area of the base layer.

The manner to confirm a virtual state where all of the above-mentioned spacers are disposed so as to have the same pitch is known, which can be achieved by using a random number generating program such as, for example, CAD, MATLAB, STELLA or Excel.

In addition, the standard deviation is a numerical value representing a degree of scattering of the number of the spacers, which is a numerical value determined by a positive square root of dispersion.

That is, when at least two or more of the rectangular regions have been optionally designated on the surface of the base layer that spacers are formed thereon and then the standard deviation of the numbers of spacers existing in the regions has been obtained, the standard deviation is 2 or less. In another example, the standard deviation may be 1.5 or less, 1 or less, or 0.5 or less. In addition, the standard deviation means that the lower the numerical value is, the desired regularity is achieved, and thus the lower limit is not particularly limited, which may be 0, for example.

Also, here, the number of the designated rectangular regions is not particularly limited as long as it is 2 or more, but in one example, it may be selected as the number that the rectangular regions are optionally selected so as not to overlap each other on the surface of the base layer, provided that the area occupied by the optionally selected regions is about 10% or more, 20% or more, 30% or more, 40% or more, 50% or more, 60% or more, 70% or more, 80% or more, or 90% or more of the total area of the base layer.

Furthermore, the range of the normal pitch (P) forming one side of the arbitrary rectangular region can be determined by the number of spacers present on the base layer and the area of the relevant base layer, as described above, which is not particularly limited, and usually, it may be determined in a range of 100 µm to 1,000 µm.

Although not particularly limited, the average number of spacers present in optionally selected square regions as above may be, for example, about 80 to 150 or so. In another example, the average number may be 82 or more, 84 or more, 86 or more, 88 or more, 90 or more, 92 or more, 94 or more, 96 or more, or 98 or more. Also, in another example, the average number may be 148 or less, 146 or less, 144 or less, 142 or less, 140 or less, 138 or less, 136 or less, 134 or less, 132 or less, 130 or less, 128 or less, 126 or less, 124 or less, 122 or less, 120 or less, 118 or less, 116 or less, 114 or less, or 112 or less.

Also, the ratio (SD/A) of the average number (A) of the spacers and the above-mentioned standard deviation (SD) may be 0.1 or less. In another example, the ratio may be 0.09 or less, 0.08 or less, 0.07 or less, 0.06 or less, 0.05 or less, 0.04 or less, or 0.03 or less.

The average number (A) or the ratio (SD/A) may be optionally changed, and for example, the numerical value may be changed in consideration of the transmittance, the cell gap and/or the uniformity of the cell gap required in the device to which the substrate is applied, and the like.

In another example, when the surface of the base layer on which the irregularly disposed spacers are formed has been divided into two or more regions having the same area, the standard deviation of the number of the spacers in each unit region may be 2 or less.

Here, the meaning of the standard deviation and the specific examples thereof are as described above.

That is, in the example, when the base layer has been divided into at least two regions having the same area and the standard deviation of the number of the spacers present in each divided unit region has been obtained, the standard deviation thereof is 2 or less. In this case, the shape of each divided unit region is not particularly limited as long as the relevant unit regions are divided so as to have the same area, but it may be, for example, a triangular, square, or hexagonal region. In addition, in another example, the standard deviation in the above state may be 1.5 or less, 1 or less, or 0.5 or less, and the lower limit thereof is not particularly limited, as described above, which may be 0, for example.

Here, the number of unit regions is not particularly limited, but in one example, the base layer may be divided into two or more, four or more, six or more, eight or more, or ten or more regions having the same area. Here, since it means that the higher the number of the divided regions, the more uniform the density of the spacers is maintained, the upper limit of the number of divided regions is not particularly limited.

When the virtual square region with P, which is a normal pitch, as one side has been selected on the substrate on which the plurality of spacers are disposed so as to have regularity and irregularity simultaneously, the average number of spacers existing in the relevant region may be in a range of 0 to 4. In another example, the average number may be 3.5 or less, 3 or less, 2.5 or less, 2 or less, or 1.5 or less. Also, in another example, the average number may be 0.5 or more. Here, the number of square regions of which the length of one side is optionally designated as the normal pitch (P) is not particularly limited as long as it is two or more, but in one example, it may be selected as the number that the square regions are optionally selected so as not to overlap each other on the surface of the base layer, provided that the area occupied by the optionally selected region is about 10% or more, 20% or more, 30% or more, 40% or more, 50% or more, 60% or more, 70% or more, 80% or more, or 90% or more of the total area of the base layer.

The entire density of the plurality of spacers can be adjusted so that the ratio of the area occupied by the spacers is about 50% or less relative to the total area of the base layer. In another example, the ratio may be about 45% or less, about 40% or less, about 35% or less, about 30% or less, about 25% or less, about 20% or less, about 15% or less, about 10% or less, about 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, or 1.5% or less. In another example, the ratio may be about 0.1% or more, 0.2% or more, 0.3% or more, 0.4% or more, 0.5% or more, 0.6% or more, 0.7% or more, 0.8% or more, 0.9% or more, or 0.95% or more.

When an optical device has been implemented by disposing a plurality of spacers on the base layer in the above form, the uniform optical characteristics can be ensured without causing the so-called moire phenomenon, while the spacers maintain the uniform pitch (cell gap) between the substrates.

The respective numerical values may be changed, if necessary, and for example, the numerical values may be changed in consideration of the transmittance, the cell gap and/or the uniformity of the cell gap required in the device to which the substrate is applied, and the like.

The plurality of spacers may be arranged such that their spacing normal distribution diagram represents a predetermined shape.

Here, the spacing normal distribution diagram is a distribution diagram showing the pitch between the spacers as the X-axis and the ratio of the spacers having the relevant pitch among all the spacers as the Y-axis, where the ratio of the spacers is a ratio obtained when the number of the entire spacer has been 1.

The pitch in the description related to the spacing normal distribution diagram herein is a length of sides in a triangle, a quadrangle or a hexagon, which is the above-mentioned closed figure.

The distribution diagram can be obtained using a known random number coordinate program, for example, a CAD, MATLAB or STELLA random number coordinate program or the like.

In one example, the plurality of spacers may be disposed such that a half height area in the distribution diagram is in a range of 0.4 to 0.95. In another example, the half height area may be 0.6 or more, 0.7 or more, or 0.85 or more. Also, in another example, the half height area may be 0.9 or less, 0.85 or less, 0.8 or less, 0.75 or less, 0.7 or less, 0.65 or less, 0.6 or less, 0.55 or less, or 0.5 or less.

The plurality of spacers may be arranged such that a ratio (FWHM/Pm) of the half height width (FWHM) to the average pitch (Pm) in the distribution diagram is 1 or less. In another example, the ratio (FWHM/Pm) may be 0.05 or more, 0.1 or more, 0.11 or more, 0.12 or more, or 0.13 or more. Also, in another example, the ratio (FWHM/Pm) is about 0.95 or less, about 0.9 or less, about 0.85 or less, about 0.8 or less, about 0.75 or less, about 0.7 or less, about 0.65 or less, about 0.6 or less, about 0.55 or less, about 0.5 or less, about 0.45 or less, or about 0.4 or less.

When at least 80% or more, 85% or more, 90% or more, or 95% or more of spacers have been selected to form a triangle, quadrangle or hexagon, which is the above-described closed figure, the above-mentioned average pitch (Pm) is an average of the lengths of the respective sides of the triangle, quadrangle or hexagon formed by the selected spacers. Here, the spacers are also selected so that the formed triangles, quadrangles or hexagons do not share vertexes with respect to each other.

The plurality of spacers may be disposed such that the half height width (FWHM) in the distribution diagram is in a range of 0.5 μm to 1,000 μm. In another example, the half height width (FWHM) may be about 1 μm or more, 2 μm or more, 3 μm or more, 4 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, 19 μm or more, 20 μm or more, 21 μm or more, 22 μm or more, 23 μm or more, or 24 μm or more. In another example, the half height width (FWHM) may be about 900 μm or less, 800 μm or less, 700 μm or less, 600 μm or less, 500 μm or less, 400 μm or less, 300 μm or less, 200 μm or less, 150 μm or less, 100 μm or less, 90 μm or less, 80 μm or less, 70 μm or less, 60 μm or less, 50 μm or less, 40 μm or less, or 30 μm or less.

The plurality of spacers may be disposed such that the maximum height (Fmax) of the spacing normal distribution diagram is 0.006 or more and less than 1. In another example, the maximum height (Fmax) may be about 0.007 or more, about 0.008 or more, about 0.009 or more, or about 0.0095 or more. Also, in another example, the maximum height (Fmax) may be about 0.9 or less, about 0.8 or less, about 0.7 or less, about 0.6 or less, about 0.5 or less, about 0.4 or less, about 0.3 or less, about 0.2 or less, about 0.1 or less, about 0.09 or less, about 0.08 or less, about 0.07 or less, about 0.06 or less, about 0.05 or less, about 0.04 or less, about 0.03 or less, or about 0.02 or less.

When an optical device has been implemented by disposing a plurality of spacers on to have the spacing normal distribution diagram in such a form, the uniform optical characteristics can be ensured without causing the so-called moire phenomenon, while the spacers maintain the uniform pitch (cell gap) between the substrates.

The concept of degree of irregularity is introduced for a plurality of spacers to be disposed so as to simultaneously have irregularity and regularity as above. Hereinafter, a method for designing the arrangement of the spacers having such a form will be described.

In order to achieve the arrangement of the spacers having the above-mentioned regularity and irregularity simultaneously, a step of starting from a normal arrangement state and relocating the spacers to have irregularity is performed.

Figure 22:
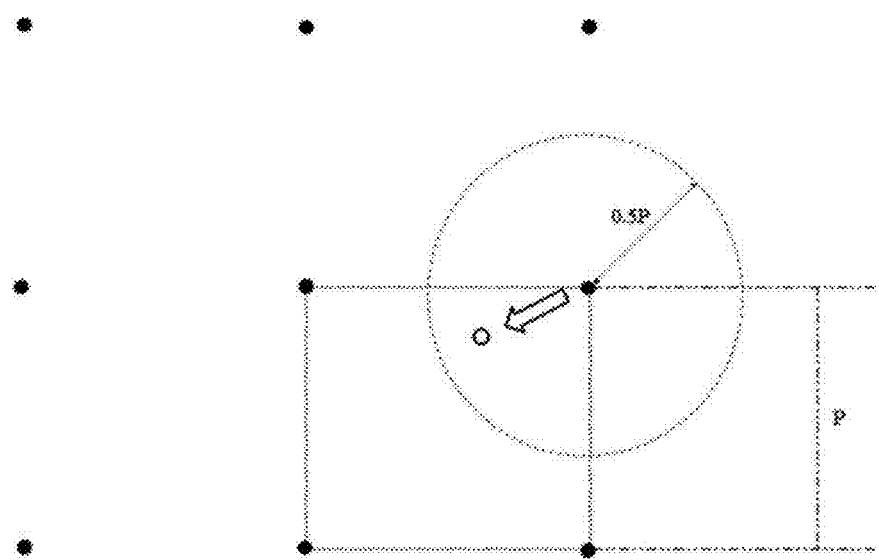
FIG. 22 is a diagram for explaining a method of implementing a degree of irregularity.
Figure 23A:
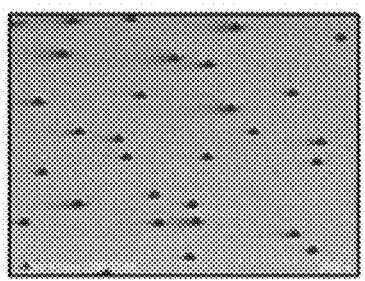
FIGS. 23A to 23D are photographs depicting lateral and side views of spacers described in Example 1.
Figure 23C:
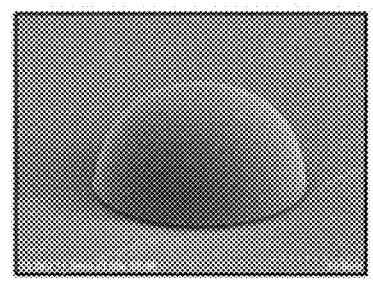
Figure 23B:
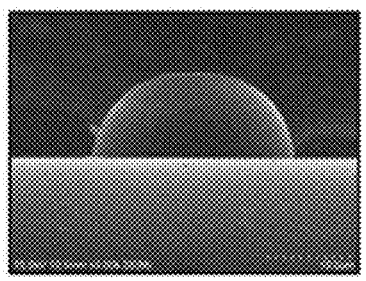
Figure 23D:
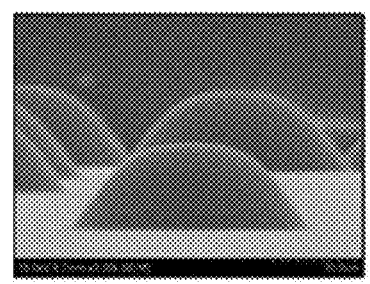

Here, the normal arrangement state is a state where the plurality of spacers are disposed on the base layer such that a regular triangle, a square or a regular hexagon in which all sides have the same length can be formed. FIG. 22 is a state in which spacers are disposed to form the square as an example. The length P of one side of the square in this state may be equal to the above-mentioned normal pitch. In such an arrangement state, a circle region having a radius of a length proportional to the length P of one side is designated on the basis of a point where one spacer exists, and the program is set so that the one spacer can be randomly moved in the region. For example, FIG. 22 schematically shows a form in which the circle region having the radius of the length of 50% (0.5P) relative to the length P is set and the spacer moves to any point in the region. The above-described arrangement can be achieved by applying such a movement to spacers of at least 80% or more, 85% or more, 90% or more, 95% or more, or 100% (all spacers).

In such a design method, the ratio for the length P which becomes the radius of the circle region may be defined as a degree of irregularity. In one example, the degree of irregularity in the design manner may be about 5% or more, about 10% or more, about 15% or more, about 20% or more, about 25% or more, about 30% or more, about 35% or more, about 40% or more, about 45% or more, about 50% or more, about 55% or more, about 60% or more, or about 65% or more. In one example, the degree of irregularity may be about 95% or less, about 90% or less, about 85% or less, or about 80% or less.

The arrangement having the above-described irregularity and regularity simultaneously can be achieved by designing the arrangement of the spacers in the same manner as above and forming the spacers according to the designed arrangement.

Also, here, although the case where the normal state starts from the square has been exemplified, the normal state may be other figures such as a regular triangle or a regular hexagon, and in this case, the above-described arrangement can also be achieved.

Furthermore, the means for designing the arrangement of the spacers in the same manner as above is not particularly limited, and a known random number coordinate program such as, for example, a CAD, MATLAB, STELLA or Excel random number coordinate program can be used.

For example, after the arrangement of the spacers is first designed in the same manner as above, a mask having a pattern according to the relevant design and the like may be manufactured, and such spacers may be implemented by applying the relevant mask to the above-described lithography or imprinting method, and the like.

The present application also relates to an optical device formed using such a substrate.

An exemplary optical device of the present application may comprise the substrate and a second substrate disposed opposite to the substrate and maintaining a gap with the substrate by the spacer in the substrate.

In the optical device, a light modulation layer may be present in a gap between two substrates. In the present application, the term light modulation layer may include all known types of layers capable of changing at least one characteristic among characteristics such as polarization states, transmittance, color tones and reflectance of incident light depending on purposes.

For example, the light modulation layer is a layer comprising a liquid crystal material, which may be a liquid crystal layer switched between a diffusion mode and a transparent mode by on-off of a voltage, for example, a vertical electric field or a horizontal electric field, a liquid crystal layer switched between a transparent mode and a blocking mode, a liquid crystal layer switched between a transparent mode and a color mode, or a liquid crystal layer switched between color modes of different colors.

The light modulation layers as above, for example, liquid crystal layers, are variously known. As one exemplary light modulation layer, a liquid crystal layer used in a typical liquid crystal display can be used. In another example, the light modulation layer may also be various types of so-called guest host liquid crystal layers, polymer dispersed liquid crystal layers, pixel-isolated liquid crystal layers, suspended particle devices or electrochromic devices, and the like.

The polymer dispersed liquid crystal layer (PDLC) is a superordinate concept including a PILC (pixel isolated liquid crystal), a PDLC (polymer dispersed liquid crystal), a PNLC (polymer network liquid crystal) or a PSLC (polymer stabilized liquid crystal), and the like. The polymer dispersed liquid crystal layer (PDLC) may comprise, for example, a liquid crystal region containing a polymer network and a liquid crystal compound dispersed in a state of being phase-separated from the polymer network.

The implementation manner or form of the light modulation layer is not particularly limited, and any known method may be employed without any limitation depending on purposes.

In addition, the optical device may further comprise additional known functional layers, such as a polarizing layer, a hard coating layer and/or an antireflection layer, if necessary.

Advantageous Effects

The present application relates to a substrate on which a specific type spacer is formed, a substrate comprising an alignment film formed on the spacer, and an optical device using such a substrate. In the present application, a structure capable of forming a high step spacer in which a desired darkening is ensured can be presented.

Mode for Invention

Hereinafter, the present application will be specifically described by way of examples, but the scope of the present application is not limited by the following examples.

Example 1

An imprinting mask of the type as shown in FIG. 18 was produced and spacers were produced using the same. According to the form shown in FIG. 18, the imprinting mask was produced by forming an imprinting mold (901) on a PET (poly(ethylene terephthalate)) main body (9), forming concave portions (9011) on the mold (901), then, forming a black layer (AlOxNy) (902) on the surface on which no concave portion (9011) was formed and forming a release layer on the black layer (902) and the concave portions (9011). At this time, the concave portion was formed into a hemispherical shape having a width in a range of approximately 24 µm to 26 µm and a height of approximately 9 µm to 10 µm or so. In addition, the concave portions were formed such that the arrangement of the spacers was such that the degree of irregularity described in FIG. 22 was about 70% or so.

Figure 24:
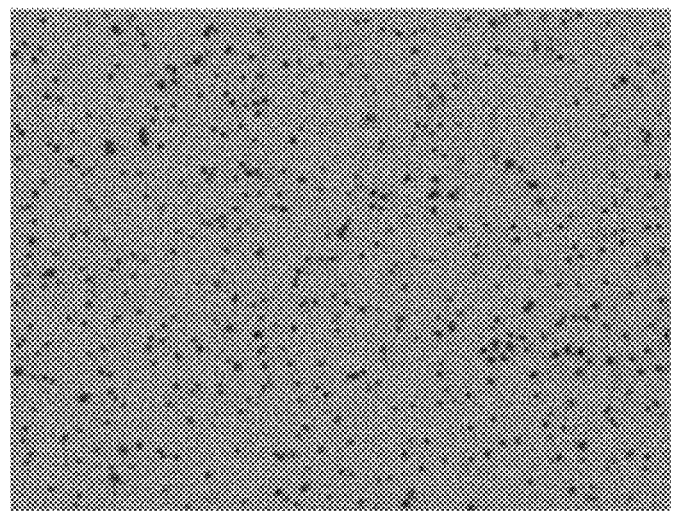
FIG. 24 is a photograph depicting a top down view of a base layer described in Example 1.

A crystalline ITO (indium tin oxide) electrode layer (40 in FIGS. 6 and 7) was formed on a PC (polycarbonate) base layer (10 in FIGS. 6 and 7), and a black layer (30 in FIGS. 6 and 7) was formed thereon. The black layer was formed into a three-layer structure (AlON/Al/AlON) having the total thickness of about 200 nm or so by depositing aluminum oxynitride (AlON), aluminum (Al) and aluminum oxynitride (AlON) to thicknesses of about 60 nm, 80 nm and 60 nm or so, respectively. Here, aluminum is a metal whose physical ductility value is known to be about 0.65. FIG. 24 is a view observing the base layer, on which the formed black layer is formed, from above, where it can be confirmed that the black layer is stably formed without causing cracks or the like on the PC base layer which is a flexible base layer.

Subsequently, about 2 to 3 mL of a mixture (UV (ultraviolet) resin) of a conventional ultraviolet curable acrylate binder and an initiator used in production of a column spacer was dropped on the black layer, the dropped mixture was pressed with the imprinting mask, and ultraviolet rays were irradiated in a state where a laminate comprising the base layer, the electrode layer, the black layer, the UV resin layer and the imprinting mask layer was formed to cure the UV resin layer. Through such a process, the condensing effect of the lens by the concave pattern of the mask (900) can be obtained, thereby increasing the degree of curing of the cured portion.

Thereafter, the hemispherical spacers were formed on the ITO electrode layer of the PC base layer and the black layer by removing (developing) the uncured UV resin layer (200) and removing (etching) the black layer at the portion where the uncured UV resin layer.

Figure 25:
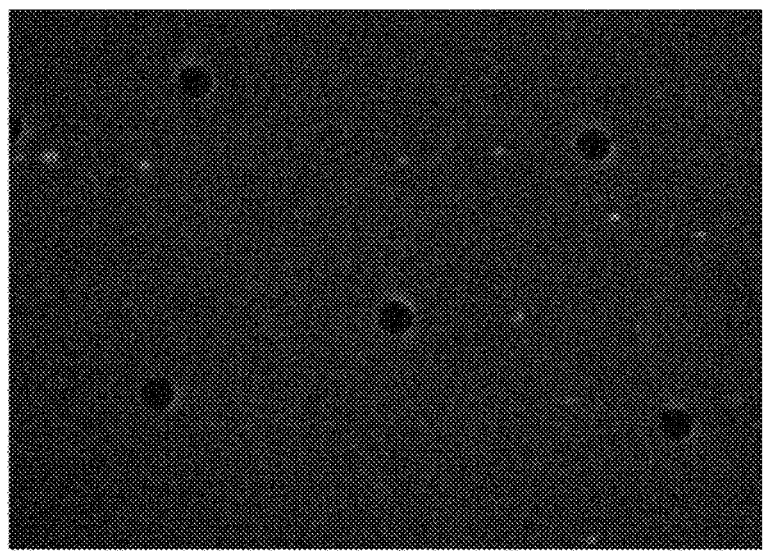
FIG. 25 is a photograph depicting a liquid crystal cell described in Example 1.

FIGS. 23A-D are lateral and side views of the hemispherical spacers manufactured in the above manner, where the formed hemispherical spacer was about 12 µm in height and about 25 µm in width. It represents a photograph. FIG. 25 is a photograph of the liquid crystal cell manufactured by applying the substrate of an example in the light shielding state.

Example 2

Figure 26A:
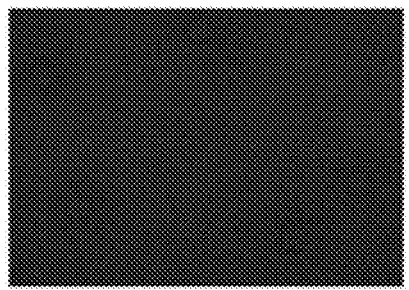
FIGS. 26A to 26B are photographs depicting top down and side views of spacers described in Example 2.
Figure 26B:
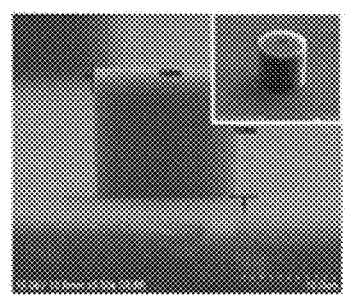

A crystalline ITO (indium tin oxide) electrode layer (40 in FIGS. 6 and 7) was formed on a PC (polycarbonate) base layer (10 in FIGS. 6 and 7) and a black layer (30 in FIGS. 6 and 7) was formed thereon, as in Example 1. The black layer was formed into a two-layer structure (Cu/CuOx) by first depositing copper (Cu) on the ITO electrode layer to a thickness of about 80 nm and then depositing copper oxide (CuOx) again to a thickness of about 30 nm. Here, copper is a metal whose physical ductility value is known to be about 0.62. Subsequently, a spacer was produced in the same manner as in Example 1, except that the mask was changed and applied so that a cylindrical column spacer could be formed a spacer. At the time of formation of the cylindrical column spacer, a commercial product of Corelink Co., Ltd., in which a light-shielding layer was formed on one side of a main body as a polyester film and then a protective layer was formed, was applied as a photomask including a light-shielding layer. FIGS. 26A-B are a photograph of the spacer thus formed. FIG. 26A is OM shape, and FIG. 26B is an SEM image.

Example 3

Figure 27A:
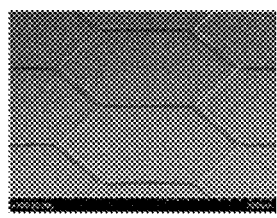
FIGS. 27A to 27E are photographs depicting lateral and top down views of spacers described in Example 3.
Figure 27B:
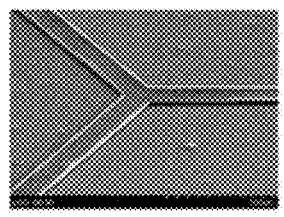
Figure 27C:
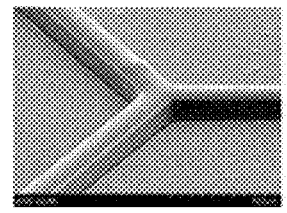
Figure 27D:
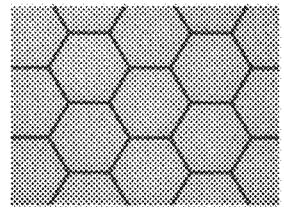
Figure 27E:
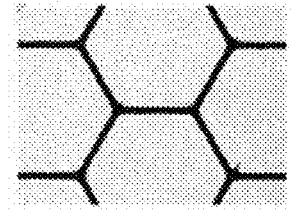

Spacers were produced in the same manner as in Example 1, except that spacers arranged in a honeycomb shape were formed. FIG. 27 is a photograph of the spacer thus formed. In FIGS. 27A-E, FIGS. 27A-B are low-magnification and high-magnification SEM (scanning electron microscope) images of the low-step pattern, respectively, FIG. 27C is a high-magnification SEM (scanning electron microscope) image of the high-step pattern, FIG. 27D is an OM (optical microscopy) low magnification image in the reflection mode, and FIG. 27E is a high magnification photograph in the transmissive mode.

Comparative Example 1

Figure 28:
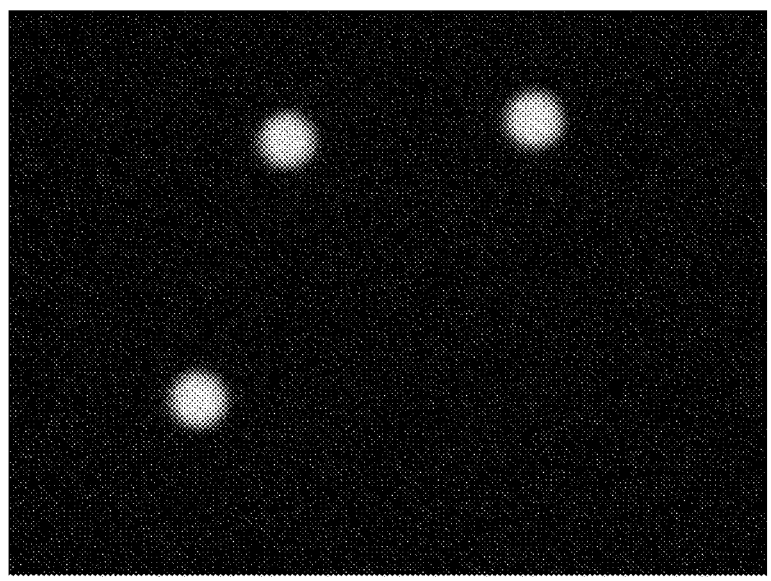
FIG. 28 is a photograph depicting a liquid crystal cell described in Comparative Example 1.

Spacers were prepared in the same manner as in Example 1 except that no black layer was formed. FIG. 28 is a photograph of the liquid crystal cell to which the substrate of Comparative Example 1 is applied in a light shielding state.

Comparative Example 2

Figure 29:
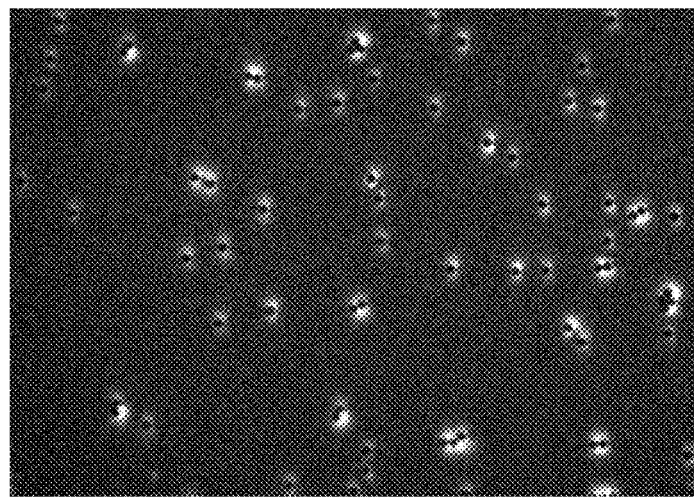
FIG. 29 is a photograph depicting a liquid crystal cell described in Comparative Example 2.

A liquid crystal cell was produced by applying a black ball spacer (Sekisui Chem, KBN-512) as a spacer, without forming a black layer and a column spacer as in Example. The liquid crystal cell was produced by coating an alignment film, in which the black ball spacers were dispersed, on an ITO electrode layer of a film, on which the ITO electrode layer was formed, as a lower base layer, coating the ITO electrode layer of the film on which the ITO electrode layer is formed, and then disposing the ITO electrode layer of a film, on which the ITO electrode layer was equally formed, opposite to the ITO electrode layer of the lower base layer coated by the alignment film in which ball spacers were dispersed, and in this state, filling liquid crystals therebetween and bonding them together. FIG. 29 is a photograph of the liquid crystal cell in the light shielding state.

Comparative Example 3

Figure 30:
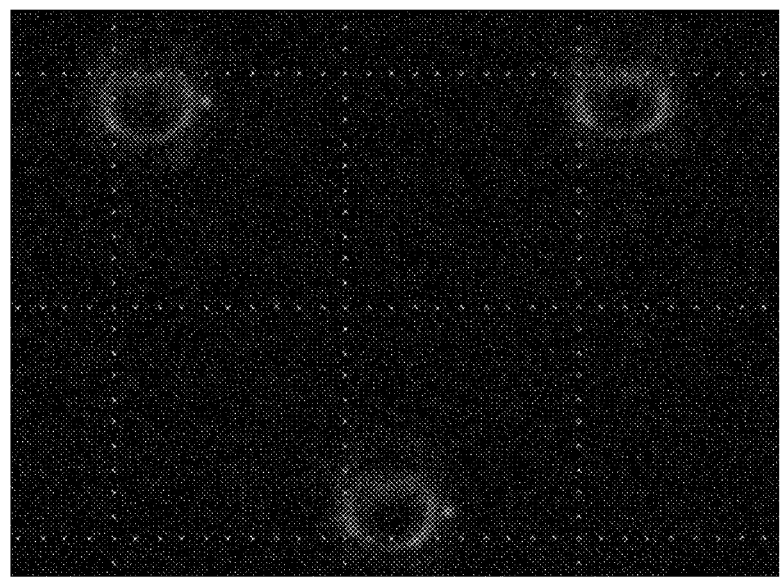
FIG. 30 is a photograph depicting a liquid crystal cell described in Comparative Example 3.
Figure 31A:
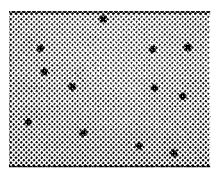
FIGS. 31A to 31D are photographs of spacers described in Example 1.
Figure 31B:
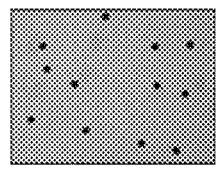
Figure 31C:
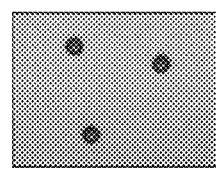
Figure 31D:
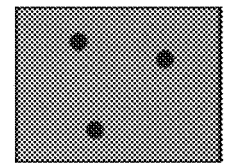
Figure 32A:
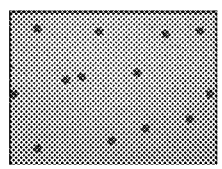
FIG. 32A to 32D are photographs of spacers described in Comparative Example 1.
Figure 32B:
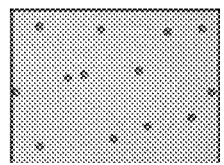
Figure 32C:
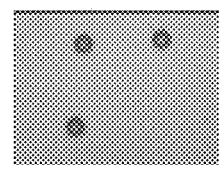
Figure 32D:

A spacer was produced in the same manner as in Example 1, except that a black layer was not formed, and instead, carbon black was applied in an amount of about 3 wt % in an ultraviolet curable resin (UV) to form a column spacer. FIG. 30 is a photograph of the liquid crystal cell to which the substrate of Comparative Example 3 is applied in the light shielding state.

Test Example 1

FIGS. 31A-D and 32 are OM (Optical Microscopy) images of the column spacer films formed in Example 1 and Comparative Example 1, respectively.

FIGS. 31A to 31D are a low magnification (×200) reflective mode image, a low magnification (×200) transmissive mode image, a high magnification (×500) reflective mode image and a high magnification (×500) transmissive mode image of Example 1 from the left, respectively, and FIGS. 32A to 32D is a low magnification (×200) reflective mode image, a low magnification (×200) transmissive mode image, a high magnification (×500) reflective mode image, and a high magnification (×500) transmissive mode image of Comparative Example 1 from the left, respectively.

Figure 33:
FIG. 33 is a photograph depicting a liquid crystal cell described in Example 1.
Figure 34:
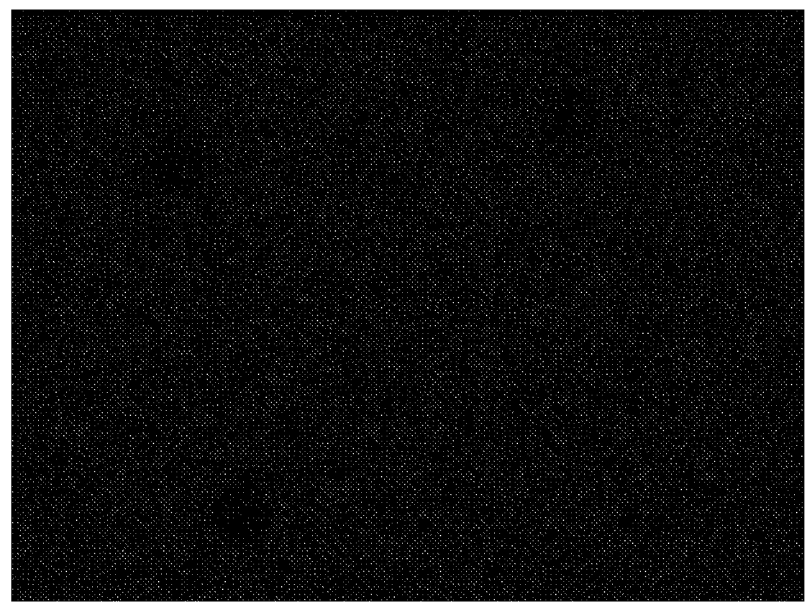
FIG. 34 is a photograph depicting a liquid crystal cell described in Example 1.
Figure 35:
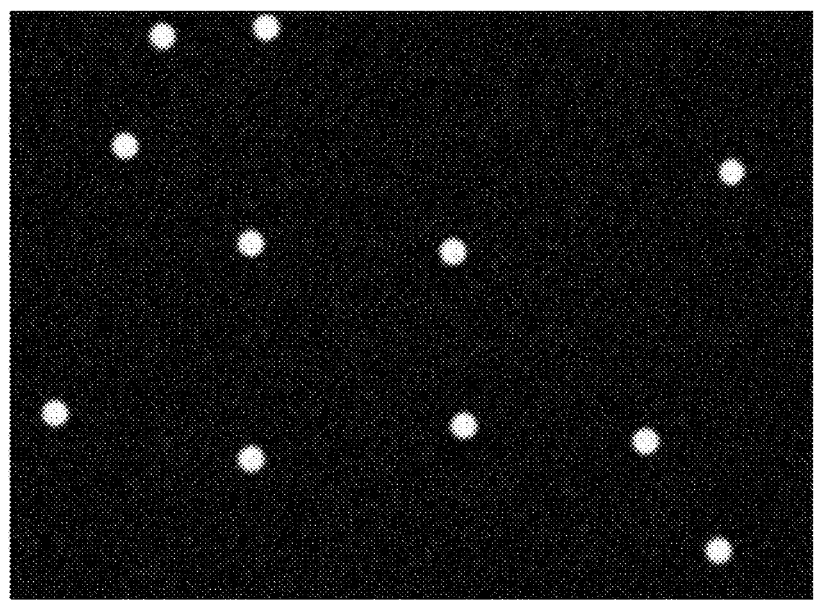
FIG. 35 is a photograph depicting a liquid crystal cell described in Comparative Example 1.
Figure 36:
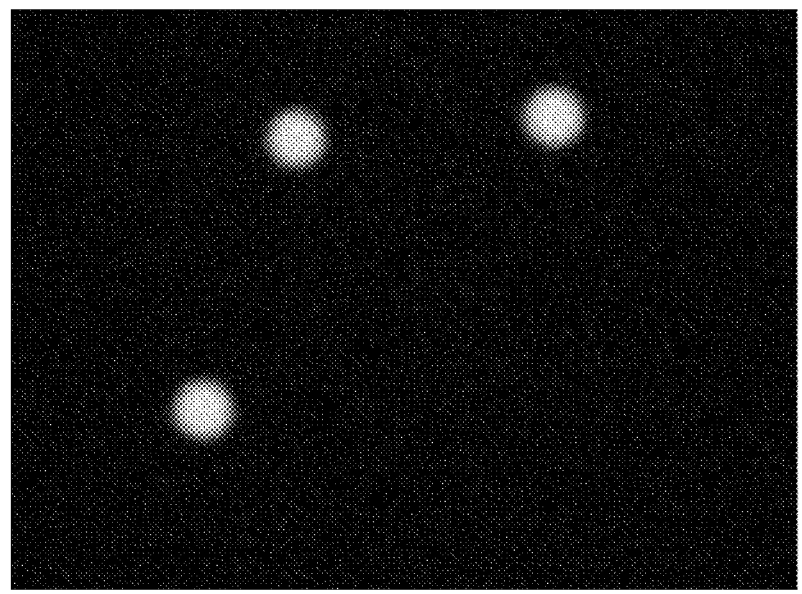
FIG. 36 is a photograph depicting a liquid crystal cell described in Comparative Example 1.

FIGS. 33 and 34 are low magnification (×200) and high magnification (×500) transmissive mode OM (optical microscopy) images of a liquid crystal cell manufactured by applying the column spacer film of Example 1 in a light shield mode, respectively, and FIGS. 35 and 36 are low magnification (×200) and high magnification (×500) transmissive mode OM (optical microscopy) images of a liquid crystal cell manufactured by applying the column spacer film of Comparative Example 1 in a light shield mode, respectively. In Comparative Example 1, light leakage arising at the column spacer formation site was observed through the drawings, thereby causing a problem that the transmittance was increased.

Also, as a result of measurement after Black Ink coating, Example 1 showed the total transmittance lower than that of the front Black Ink coating (11.7 µm front Black Ink coating transmittance: about 1.7%) due to high optical density compared to coated Black Ink, and Comparative Example 1 showed the total transmittance higher than that of the front Black Ink coating due to the light leakage (12.5 µm front Black Ink coating transmittance: about 2.2%).

The invention claimed is:

1. A substrate, comprising:
   a base layer;
   a transparent column spacer formed on the base layer; and
   a black layer present between the transparent column spacer and the base layer; and
   an electrode layer disposed between the black layer and the base layer,
   wherein the black layer comprises a metal having a physical ductility value of 0.55 or more,
   wherein the base layer is a flexible base layer and capable of bending, and
   wherein the black layer does not develop defects when the base layer is bent,
   wherein the base layer is a plastic film,
   wherein the electrode layer contacts the black layer,
   wherein the black layer is a multilayer structure comprising a first layer and two second layers, each of the second layers on opposing sides of the first layer,
   wherein the first layer is a metal layer,
   wherein the second layer is a metal oxide layer, a metal nitride layer or a metal oxynitride layer, and
   wherein each of the metal layer, the metal oxide layer, the metal nitride layer and the metal oxynitride layer has the metal having a physical ductility value of 0.55 or more.

2. The substrate according to claim 1, wherein a ratio (T/B) of an area (B) of the black layer and an area (T) of a bottom of the column spacer is in a range of 0.5 to 1.5.

3. The substrate according to claim 1, wherein the black layer has an area equal to or smaller than that of the bottom of the column spacer.

4. The substrate according to claim 1, wherein the black layer and the column spacer are overlapped with each other.

5. The substrate according to claim 1, wherein the black layer has a thickness in a range of 30 nm to 5000 nm.

6. The substrate according to claim 1, wherein the first layer and the two second layers each have a thickness in a range of 30 nm to 200 nm.

7. The substrate according to claim 1, wherein the spacer has a hemispherical portion on the end of the spacer opposite the black layer.

8. An optical device, comprising:
   the substrate of claim 1; and
   a second substrate disposed opposite to the substrate,
   wherein a gap is maintained between the substrate and the second substrate by the spacer.

9. The optical device according to claim 8, wherein a liquid crystal material is present in the gap.

* * * * *